United States Patent
Goto

(10) Patent No.: US 10,532,605 B2
(45) Date of Patent: Jan. 14, 2020

(54) METHOD FOR MANUFACTURING DECORATIVE PARTS

(71) Applicant: TRINITY INDUSTRIAL CORPORATION, Aichi (JP)

(72) Inventor: Yukihiro Goto, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 330 days.

(21) Appl. No.: 15/309,855

(22) PCT Filed: Dec. 1, 2014

(86) PCT No.: PCT/JP2014/081705
§ 371 (c)(1),
(2) Date: Nov. 9, 2016

(87) PCT Pub. No.: WO2015/173985
PCT Pub. Date: Nov. 19, 2015

(65) Prior Publication Data
US 2017/0259613 A1 Sep. 14, 2017

(30) Foreign Application Priority Data
May 12, 2014 (JP) ................................ 2014-098838

(51) Int. Cl.
*B23K 26/082* (2014.01)
*B23K 26/352* (2014.01)
(Continued)

(52) U.S. Cl.
CPC .......... *B44C 1/228* (2013.01); *B23K 26/0006* (2013.01); *B23K 26/082* (2015.10);
(Continued)

(58) Field of Classification Search
CPC .... B44C 1/228; B23K 26/082; B23K 26/355; B23K 2103/42; B23K 26/364;
(Continued)

(56) References Cited

U.S. PATENT DOCUMENTS

| | | | | |
|---|---|---|---|---|
| 2010/0279042 | A1* | 11/2010 | Hsu ........................ | B05D 5/06 428/35.7 |
| 2016/0031041 | A1* | 2/2016 | Goto ...................... | B44C 1/228 428/156 |
| 2017/0266690 | A1* | 9/2017 | Shimada .................. | B05D 3/12 |

FOREIGN PATENT DOCUMENTS

| | | | |
|---|---|---|---|
| JP | 2011-110570 | * | 6/2011 |
| JP | 2011-147969 | | 8/2011 |

(Continued)

*Primary Examiner* — Nahida Sultana
*Assistant Examiner* — Debjani Roy
(74) *Attorney, Agent, or Firm* — Clark & Brody

(57) ABSTRACT

This invention provides a method for manufacturing a decorative-part of which the joint-lines bordering the laser-irradiation regions are unnoticeable, thus avoiding deterioration of the design-quality of such a decorative-part. Of this invention, the design (4) comprises the first-blocks (6) of a plurality of design-patterns (5) that are closely arranged with the second-blocks (8) of a plurality of design-patterns (7) that are different from those of the first-blocks (6). In the laser-irradiation-region-setting process, the decorative-area is divided into a plurality of laser-irradiation regions (LR1, LR2 and LR3), at which time the joint-lines (J1, J2) are set as borders of the first-blocks (6) and the second-blocks (8) of the design (4). In the laser-irradiation process, a laser-deflector is relatively displaced, and a laser L is irradiated onto each of the laser-irradiation regions (LR1, LR2 and LR3).

3 Claims, 7 Drawing Sheets

(51) Int. Cl.
  *B23K 26/364* (2014.01)
  *B23K 26/402* (2014.01)
  *B44C 1/22* (2006.01)
  *B23K 26/00* (2014.01)
  *B29C 35/08* (2006.01)
  *B23K 103/00* (2006.01)
  *B29K 55/02* (2006.01)
  *B29L 31/30* (2006.01)

(52) U.S. Cl.
  CPC ........ *B23K 26/352* (2015.10); *B29C 35/0805* (2013.01); *B23K 2103/42* (2018.08); *B29C 2035/0838* (2013.01); *B29K 2055/02* (2013.01); *B29L 2031/3005* (2013.01)

(58) Field of Classification Search
  CPC ............ B23K 26/042; B23K 2101/006; B23K 2101/34; B23K 26/352; B44F 9/00; B29C 35/0805
  See application file for complete search history.

(56) References Cited

FOREIGN PATENT DOCUMENTS

| | | | |
|---|---|---|---|
| JP | 2012-176438 | * | 9/2012 |
| JP | 2012-176744 | | 9/2012 |
| JP | 2013-514539 | | 4/2013 |
| JP | 2014-034032 | | 2/2014 |

* cited by examiner

METHOD FOR MANUFACTURING DECORATIVE PARTS

TECHNICAL FIELD

This invention relates to a method for manufacturing decorative-parts by a laser-irradiation process of which a laser is irradiated onto a decorative-area that is set upon the surface of a three-dimensional part-material to have designs drawn thereon.

TECHNICAL BACKGROUND

To improve the design or quality of automotive-decoration or the like, many different decorated parts of a vehicle (i.e. the console-box, the instrument panel, and arm-rests or the like) are practically used, and such decoration is added to the surface of a resin-compact. As a method for adding decoration to a decorative-part, laser-drawing is suggested (e.g. Patent Document 1). This laser-drawing is a decorative-method of which a laser is irradiated onto the decorative-area of a decorative-part, with the emitting heat of the laser changing the surface-condition of the part, thus making it possible to draw a design thereon.

If the three-dimensional shape of the resin-compact is complicated, or if the size of the resin-compact is too large, the area in which the laser is not irradiated will increase, which would make it difficult to do the laser-irradiation upon the whole surface of the resin-compact, thus making it impossible to obtain a clear design. To resolve this problem, it is conventionally suggested for example that the decorative-area be divided into a plurality of laser-irradiated regions, and that the laser be irradiated onto each of the laser-irradiated regions by moving the resin-compact or Galvano-head to the appropriate position (see e.g. Patent Document 2). Also, as shown in patent Documents 1 and 2, the design 100 (see FIG. 10) representing a carbon-fiber-woven fabric is drawn onto the surface of the automobile-interior part.

PRIOR ARTS DOCUMENTS

Patent Documents

Patent Document 1: Japanese published unexamined application 2012-176744.
Patent Document 2: Japanese published unexamined application 2014-34032.

DISCLOSURE OF THE INVENTION

Problems to be Resolved by the Invention

By the conventional laser-drawing method, the laser-irradiation region divided on the decorative-area is set according to the range that can be processed by a laser-deflector. Thus, the laser-irradiation region is a rectangular-shaped one. In this case, as shown in the design 100 of FIG. 10, the borderline (joint-line J100) of the laser-irradiation areas LR100 and LR101 runs linearly through the design-pattern, thus dividing the design-pattern of a carbon-fiber-woven fabric. As such, in the case that there is a clearance or a shear in the joint-line J100, the joint-line J100 is visibly noticeable, thus markedly decreasing the quality of the design.

This invention was achieved in light of the foregoing problems in providing a method for manufacturing a decorative-part of which the joint-lines running between the laser-irradiation regions are unnoticeable, thus avoiding deterioration of the design-quality of the decorative-part.

Means of Solving the Problems

To solve the aforementioned problems, the first aspect of this invention refers to a method for manufacturing a decorative-part by a laser-irradiation process of which a laser is irradiated by a laser-irradiation device onto a decorative-area set on the surface of a there-dimensional part-material, thereby drawing a design thereon that aligns a plurality of design-patterns on the decorative-area, characterized in that the plurality of the first-blocks of a plurality of design-patterns are closely arranged with the plurality of the second-blocks of a plurality of design-patterns that are different from those of the first-blocks, and that prior to the laser-irradiation process, a laser-irradiation-region-setting process is done to set the joint-lines of the laser-irradiation regions as borders of the first-blocks and the second-blocks and then to irradiate the laser onto each of the laser-irradiation regions by relatively displacing the laser-deflector of the laser-irradiation device or by relatively displacing the part-material.

The first aspect of this invention allows for setting a decorative-area onto the surface of a part-material constituting a decorative-part so as to draw a design of a plurality of design-patterns arranged on the decorative-area. The design consists of first-blocks of a plurality of design-patterns that are closely arranged with second-blocks of a different plurality of designs from those of the first-blocks. Of the manufacturing-method of this invention, prior to the laser-irradiation process, a laser-irradiation-region-setting process is done in which the decorative-area onto which the design is to be drawn is divided into a plurality of laser-irradiation regions. The joint-lines bordering the plurality of laser-irradiation regions also border the first-blocks and the second-blocks of the design. In the laser-irradiation process, either the laser-deflector or the part-material is relatively displaced. Then, the laser is irradiated onto each of the plurality of laser-irradiation regions, thus forming the design across the joint-lines of the adjoining laser-irradiation regions without overlaying the design-patterns across each laser-irradiation region. As such, no joint-line is formed within the design patterns, as was shown to have happened in the conventional arts. Therefore, the joint-lines are unnoticeable, thus avoiding deterioration in the quality of design of the decorative-part.

The joint-lines that are set during the laser-irradiation-region-setting process and that border the plurality of the laser-irradiation regions are not straight lines. The design that is laser-drawn is one that represents a fiber-woven fabric and can be structured so that the first-blocks of a plurality of elongated-design patterns are closely arranged with the second-blocks of a plurality of elongated-design patterns that are directed in a different direction from those of the first-blocks. In the case that the automobile-interior part is divided accordingly by the borderlines of the first-blocks and the second-blocks of the plurality of laser-irradiation regions, such joint-lines bordering the adjoining laser-irradiation regions can be multiply bent at a right angle. Specifically, such joint-lines bordering the adjoining laser-irradiation regions can be cranked or bent in a zigzag manner. In such a case, by setting the joint-lines that border the adjoining laser-irradiation regions as borders of the first-blocks and the second-blocks, such joint-lines are unnoticeable, thus avoiding deterioration in the quality of design of the decorative-part.

The part-material on which the decorative-area is set comprises a first-part of a first-face of a relatively large surface-area and a second-part of a second-face of a relatively small surface-area and a connecting-curved-part with a bent-section for connecting the first-part to the second-part, which bent-section is located between the first-face and the second-face. In the case that the decorative-area of the part-material extends over the first-face and the second-face, it is possible during the laser-irradiation-region-setting process to set a joint-line near the first-face of the curved-surface of the connecting-curved-part. Hence, the curved-surface of the connecting-curved-part that connects the first and second faces is a state of which the partial design-pattern of each block comes out of the first and second faces. The design-pattern that runs out of the curved-surface of the connecting-curved-part from the first-face of the large surface-area is of more difference in height than the design-pattern on the first-face, thus making it difficult for the laser to be extended when processing the design-pattern on the first-face. On the other hand, the design-pattern that comes out of the curved-surface of the connecting-curved-part from the second-face of the small surface-area is of lesser difference in height than the design-pattern on the second-face, thus making it easier for the laser to be extended when processing the design-pattern onto the second-face. As such, in setting a joint-line that borders the laser-irradiation regions near the first-face on the curved-surface of the connecting-curved-part, such a design-pattern that comes out to the curved-surface can be surely processed when processing the design-pattern onto the second-face. Also, setting a joint-line that borders the laser-irradiation regions onto the curved-surface of a connecting-curved-part makes it difficult to notice that joint-line, thus avoiding deterioration in the quality of the design of the decorative-part.

It is possible to form a concave-part as the design-pattern onto a laser-irradiation region, of which concave-part the depth is 6 µm through 16 µm, and the width is 30 µm through 110 µm. Forming such a concave-part of which the depth and width are within the favorable range makes it possible to draw the design accurately and evenly, even when drawing a design of which the plurality of the first and second blocks comprising a plural design-patterns are closely arranged. As such, it is surely possible to provide a high-quality design on the decorative-part.

The decorative-part of this invention comprises a resin-compact that is three-dimensionally formed as the part-material, and which decorative-part comprises a coat-layer of black coating-material that covers the surface of the resin-compact. The design of the decorative-part can be one representing a carbon-fiber-woven fabric that can be drawn on the coat-layer. In drawing such a design representing a carbon-fiber-woven fabric, it is possible to provide a high-quality design on the decorative-part.

Effects of the Invention

As described above, the first-aspect of this invention allows for the joint-lines bordering the laser-irradiation regions to be unnoticeable, thus avoiding deterioration of the design-quality of such a decorative-part.

MODES FOR CARRYING OUT THE INVENTION

Hereinafter, as the embodiment of this invention, the method for manufacturing automobile-interior parts will be described in reference to FIGS. 1 to 8.

Figure 1:
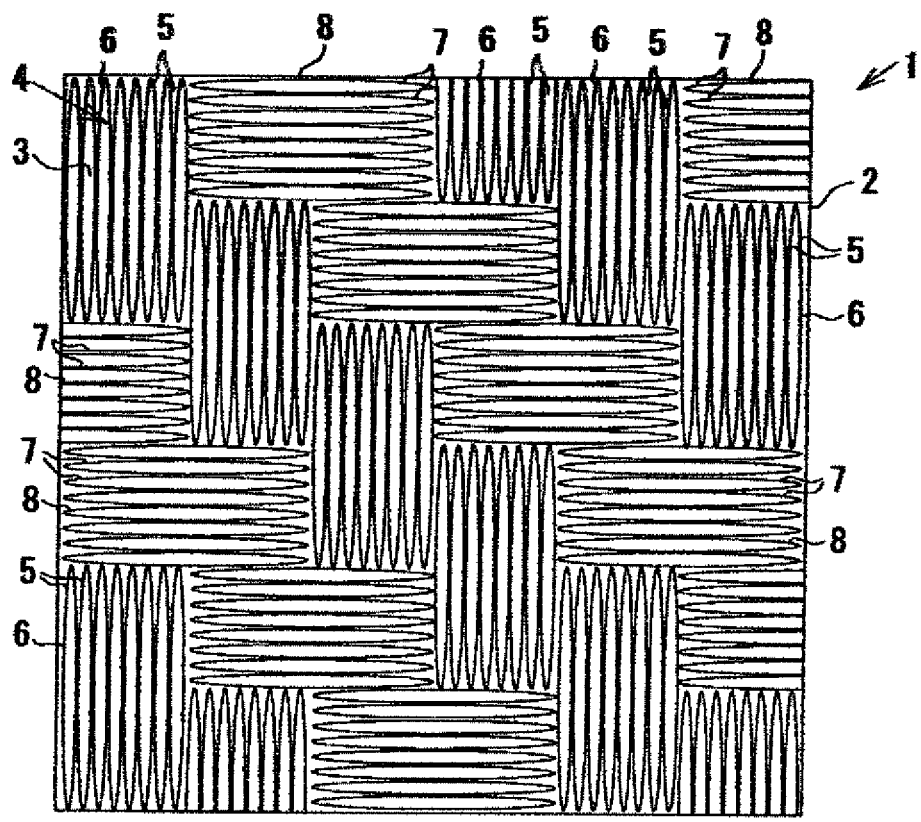
FIG. 1 is the enlarged top-view showing the automobile-interior part as manufactured by the method as the embodiment of this invention.
Figure 2:
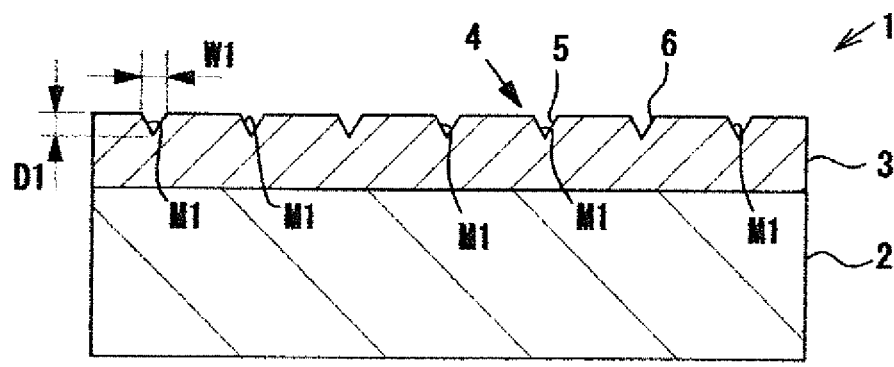
FIG. 2 is the enlarged cross-sectional view showing the automobile-interior part as the embodiment of this invention.
Figure 3:
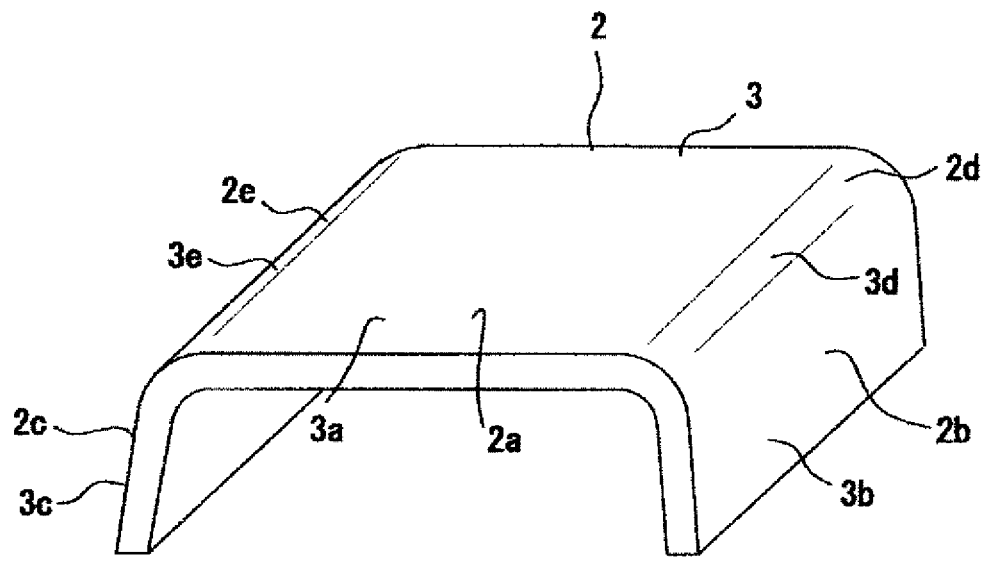
FIG. 3 is the oblique-perspective view showing the part-material.

FIG. 1 is the enlarged top-view showing part of the surface of the automobile-interior part 1 as a decorative-part. FIG. 2 is the enlarged cross-sectional view showing the automobile-interior part 1. As shown in FIGS. 1 and 2, the automobile-interior part 1 comprises a three-dimensional part-material 2 and a coat-layer 3 that is formed to cover the surface of the part-material 2. As shown in FIG. 3, the part-material 2 as an embodiment of this invention is substantially a U-shaped part comprising a main-part 2a and a pair of side-parts 2b, 2c comprising the sides of the main-part 2a.

As shown in FIGS. 1 and 2, the carbon-like design 4 representing a carbon-fiber-woven fabric is drawn on the surface of the coat-layer 3. The automobile-interior part 1 as the embodiment of this invention is, for example, the part used in making an armrest of an automobile door. The part-material 2 is a resin-compact formed of an ABS resin and is totally black in color. The coat-layer 3 that covers the surface of the part-material 2 is formed of a coating-material in high-gloss (piano) black. The design 4 is decorated on the coat-layer 3 by the laser-drawing (specifically, laser-abrasion) process that is a non-thermal process of which the laser is irradiated onto a solid, and then atoms, molecules and clusters are directly evaporated without melting, thus clipping off the surface of the solid.

Figure 4:
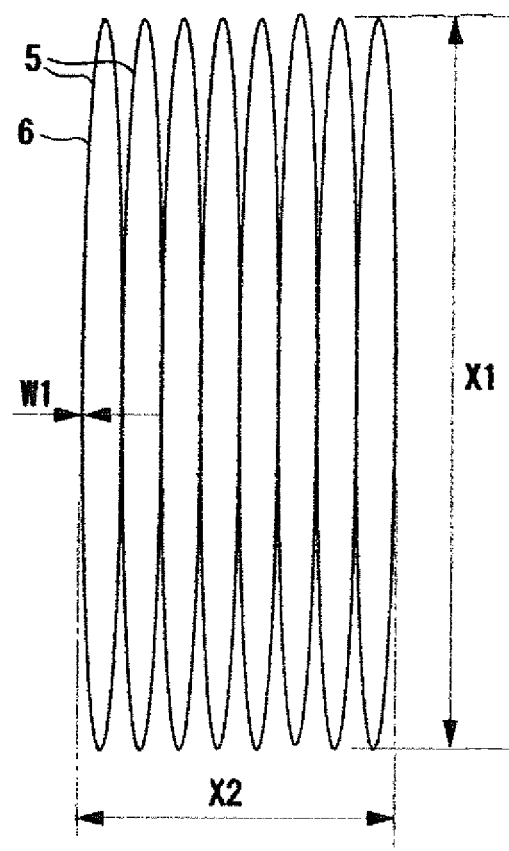
FIG. 4 is the enlarged top-view showing the first-block of the design.

The design 4, as an embodiment of this invention, is structured so that the plurality of the first-blocks 6 of a plurality of vertical-elongated design-patterns 5 are closely arranged with the plurality of the second-blocks 8 of a plurality of horizontal-elongated design-patterns 7. In the design 4, the direction of the design-patterns of the first-blocks 6 and the direction of the design-patterns of the second-blocks 8 bisect at a right angle. Specifically, the design-pattern 5 of the first-blocks 6 is of a vertical-oblong pattern, i.e. the vertical-diameter is longer than the horizontal-diameter; and the design-pattern 7 of the second-blocks 8 is of a horizontal-oblong pattern, i.e. the horizontal-diameter is longer that the vertical-diameter. As shown in FIG. 2 and FIG. 4, each design-pattern 5, 7 of the embodiment of this invention is formed by the laser-processed grooves M1 of which the line-width W1 is 30 µm through 110 µm, and the depth D1 is 6 µm through 16 µm and of which are drawn by laser-irradiation. The reason that the line-width W1 and the depth D1 are set within the above ranges is that that condition of reflection on the surface is preferred and is the condition that prevents a difference in reflection, thus making it easier in achieving the aimed design. As shown in the embodiment of this invention, when it is surely required to draw the carbon-like-design pattern 4 representing the carbon-fiber-woven fabric, it is preferable to set the line-width W1 and the depth D1 of the laser-processed groove to form each of the design-patterns 5, 7 at 50 µm through 75 µm and at 10 µm through 16 µm, respectively.

Regarding the design 4 of the embodiment of this invention, the vertical-width of the first-block 6 is the same as the longer-diameter X1 of the oblong-pattern and is the ratio of the vertical-width (i.e. X1) to the horizontal-width X2, which is 2:1. The first-block 6 is adjoined horizontally to another first-block 6 that is vertically halfway down. On the other hand, the second-block 8 is adjoined horizontally to the other first-block 6 and is vertically halfway down. Also, the first-block 6 and the second-block 8 are alternatively arranged vertically and horizontally. The design 4 of sateen-weave representing the carbon-fiber-woven fabric is formed with the oblong-patterns of the first-blocks 6 and second-blocks 8.

Figure 5:
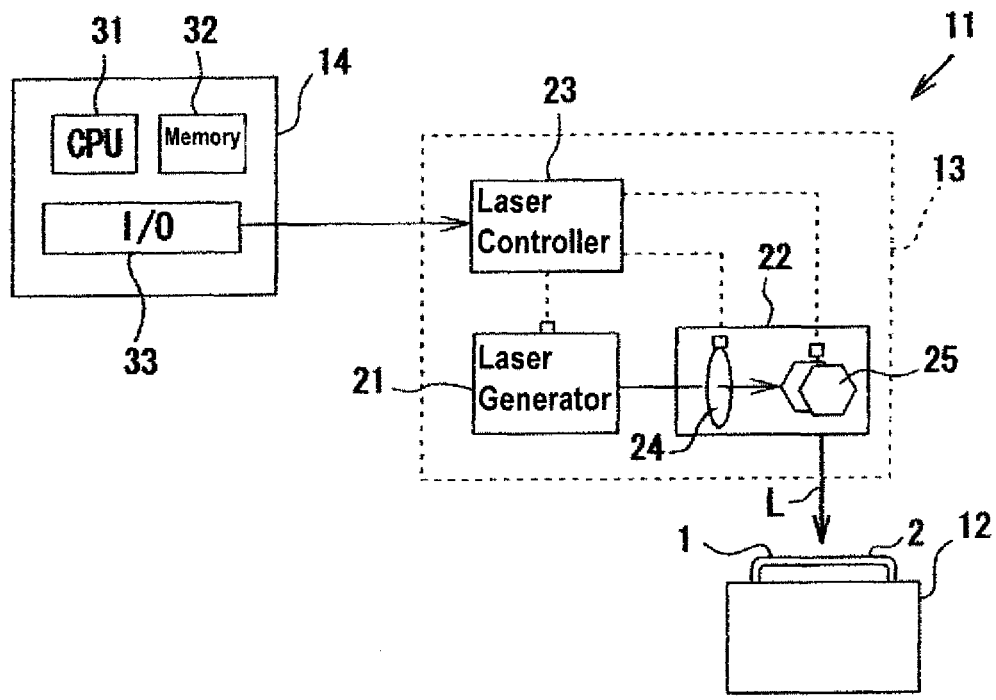
FIG. 5 is the skeleton-framework showing the laser-processing device.

FIG. 5 shows the laser-processing device 11 for drawing the design 4 on the automobile-interior part 1. The laser-processing device 11 of the embodiment of this invention comprises a supporting-board 12 for supporting the part-material 2 of the automobile-interior part 1; a laser-irradiation device 13 for irradiating the laser L onto the surface of the part-material 2 of the automobile-interior part 1; and a control-device 14 for controlling the laser-irradiation device 13.

The laser-irradiation device 13 comprises a laser-generator 21 for generating the laser L at a specified wavelength (i.e. a $YVO_4$ laser at 1,064 nm wavelength); a laser-deflector 22 for deflecting the laser L; and a laser-controller 23 for controlling the laser-generator 21. The laser-deflector 22 is an optical system comprising a lens 24 and a reflecting-mirror 25. The position of the lens 24 and reflecting mirror 25 can be changed to adjust the irradiation-position and focal point of the laser L. The laser-controller 23 controls the laser-generator 21 and the laser-deflector 22 for adjusting the laser-irradiation condition, such as the laser L scanning-speed or the like.

The control-device 14 comprises the commonly known computer the CPU 31, the memory 32, and the input/output port 33 or the like. The control-device 14 is connected electrically to the laser-irradiation device 13 and controls said device by various drive-signals.

The memory 32 of the control-device 14 has an irradiation-parameter that shows the design-data according to the design-patterns 5, 7 of the design 4 and shows the laser-irradiation condition (i.e. the irradiation-time and irradiation-intensity or the like) of the laser-irradiation device 13. The control-device 14 controls the laser-irradiation device 13 according to the laser-irradiation data that is stored in the memory 32, and such control-device 14 forms and decorates the design 4 onto the automobile-interior part 1. The memory 32 of the embodiment of this invention also holds the programming-data concerning the determination of the laser-irradiation region.

The laser-processing device 11 of the embodiment of this invention comprises a work-displacement robot that is not shown in the drawing. The laser-deflector 22 is firmly affixed on the tip of the robot arm. The control-device 14 controls the work-displacement robot based on the robot-control data that is stored in the memory 32. As such, in activating the robot arm, the position and angle of the laser-deflector 22 is changed accordingly, thus changing the irradiation-position and the irradiation-angle of the laser L onto the surface of the part-material 2.

Hereinafter, the method for manufacturing the automobile-interior part 1 is described. Firstly, the part-material 2 that is formed of an ABS resin is prepared. Then, the coat-layer 3 is applied onto the surface of the part-material 2. This whole surface of the part-material 2, which is covered with the coat-layer 3, is now the decorative-area. The image-data of the design 4 that is to be drawn onto the decorative-area is made by image-making software, which process is conventionally known as the image-data-making process. The next step is the image-data-conversion process, whereby the CPU 31 converts the prepared image-data into CAD data. However, a computer other than the control-device 14 can convert the image-data into CAD data.

Figure 7:
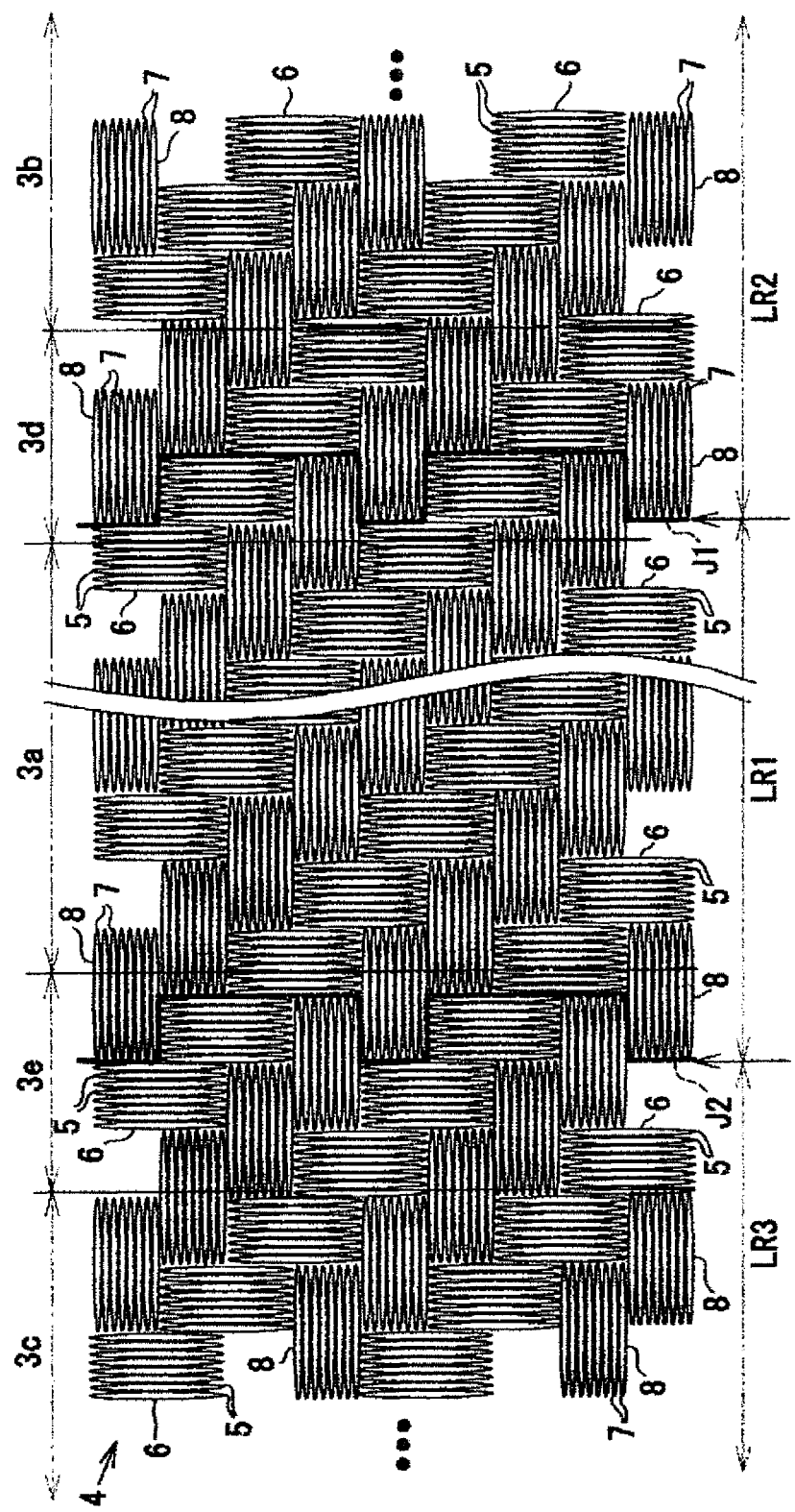
FIG. 7 is the explanatory-diagram showing the joint-lines bordering the laser-irradiation regions.

Next, in the laser-irradiation-region-setting process, the CPU 31 divides the decorative-area into a plurality of laser-irradiation regions LR1, LR2 and LR3 by setting the joint-lines J1, J2 as borders of the plurality of laser-irradiation regions, as well as borders of the first-blocks 6 and the second-blocks 8 of the design 4 (see FIG. 7). The CPU 31 then sets the image-data onto the decorative-area of each of the laser-irradiation regions LR1, LR2 and LR3.

Hereinafter, the laser-irradiation-region-setting process is described. At the beginning of the setting-process, the CPU 31 determines if the specified region of the decorative-area consists of a continuous-surface of which the flexion-angle or curvature-angle is less than the predetermined-value. In this process, the surface of the major-part 2a of the largest area of the part-material 2 is set as the "specified region," and the predetermined-value of the flexion-angle or curvature-angle is set at 18 degrees (90 degrees minus 72 degrees). Regarding the laser-irradiation device 13 being used as the embodiment of this invention, the distance from the laser-defector 22 to the irradiation-surface is set at 300 mm, and the preferable laser-irradiation angle is set at 72 degrees to 90 degrees. Of the embodiment of this invention, the laser-irradiation range of the laser L, ranging from 72 degrees to 90 degrees, is conveniently defined as the "optimum irradiation-range." The optimum irradiation-range is a rectangular area of approximately 140 mm square, and the distance from the center to the corner of this rectangular area (i.e. the half-length of the diagonal line) is approximately 100 mm.

In the case that the specified-region is considered as the continuous-surface of less than 18 degrees, the CPU 31 defines such a specified-region as the "broad-sense same-plane," which, as the embodiment of this invention, means that it is not only a plane but a continuous-surface at an angle of 72 degrees to 90 degrees, as seen from the specified surface-direction, although the surface is curved or curled. The CPU 31 then compares the size of the specified-region to that of the irradiation-region of the laser L (i.e. the optimum-irradiation range) that is established when the irradiation-angle is set at 72 degrees. In the case that the specified-region is determined as being smaller than the optimum-irradiation region, the CPU 31 determines not to divide the decorative-regions within the specified-region.

On the other hand, in the case that the specified-region is considered to be larger than the optimum-irradiation range, the CPU 31 determines to divide the decorative-area within the specified-region and into a plurality of laser-irradiation regions. Even in the case that the specified-region is not considered a continuous-surface of less than 18 degrees, the CPU 31 will not consider such a specified-region as being the "broad-sense same-plane" and will divide the decorative-area within the specified-region.

Figure 6:
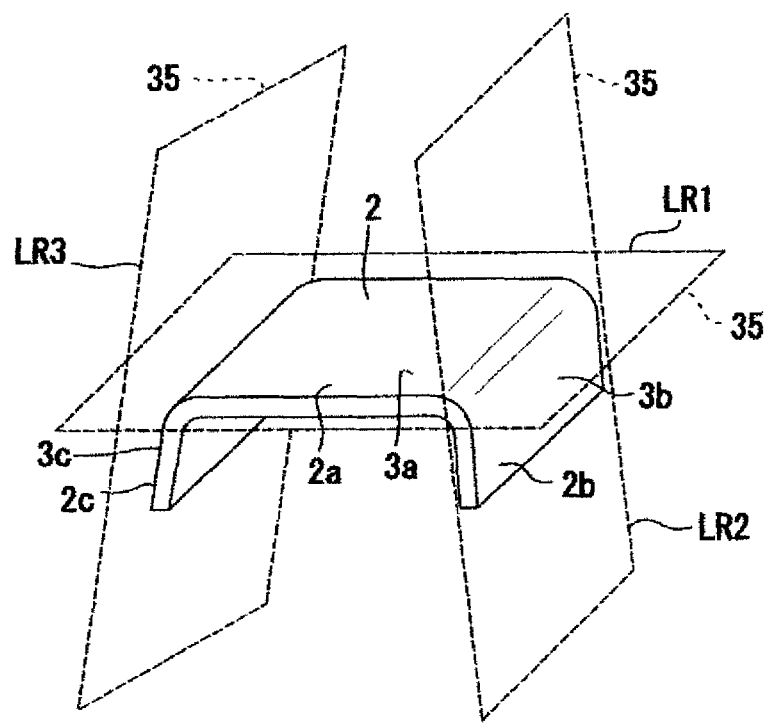
FIG. 6 is the explanatory-diagram of the laser-irradiation region-setting process.

For example, as shown in FIG. 3, if the part-material 2 is a small part and is an object to be processed, then the surface 3a of the main-part 2a that is the specified-region (i.e. the surface of the coat-layer 3 that is formed on the main-part 2a) is considered as the "broad-sense same-plane." Then, the size of the surface 3a of the main-part 2a is compared to that of the optimum-irradiation range 35. At this time, the size of the surface 3a of the main-part 2a is less than that of the optimum-irradiation range 35. Then, the surface 3a of the main-part 2a of the decorative-area is not divided. Also, the surfaces 3b, 3c of the pair of sides 2b, 2c of the part-material 2 as the small-part are not considered as the "broad-sense same-plane," as is the surface 3a of the main-part 2a, but are considered each as a different plane. The size of the surfaces 3b, 3c of the sides 2b, 2c is each smaller than that of the optimum-irradiation range 35. Thus, the decorative-part especially is not divided. Therefore, as shown in FIGS. 6 and 7, the three irradiation-regions LR1, LR2 and LR3 are set on the small part of the part-material 2.

Specifically, as is shown in FIG. 3, the main-part 2a as the first-part of the part-material 2 comprises a surface 3a (first-face) of which the surface-area is relatively large, and the side-areas 2b, 2c as the second-part comprise the surfaces 3b, 3c (second-face) of which the surface-area is relatively small. Also, the part-material 2 comprises the curved-surfaces 3d, 3e that connect the surface 3a of the main-part 2a to the surfaces 3b, 3c of the side-parts 2b, 2c and to the connecting-curved-parts 2d, 2e that are located between the main-part 2a and the side-parts 2b, 2c. Also, the decorative-part of the part-material 2 is set to run across the surface 3a of the main-part 2a to the surfaces 3b, 3c of the side-parts 2b, 2c.

In such a case (see FIG. 7), the CPU 31 in the laser-irradiation region-setting process sets the joint-lines J1, J2 that border the adjoining laser-irradiation regions LR1, LR2, and LR3 at the position near the first-surface 3a (main-part 2a) on the curved-surfaces 3d, 3e of the connecting-curved-parts 2d, 2e. FIG. 7 is the development-diagram showing the planar-state of the main-part 2a and the side-parts 2b, 2c and showing the connecting-curved-parts 2d, 2e comprising the part-material 2. As shown in FIG. 7, the joint-lines J1, J2 that border the adjoining laser-irradiation regions LR1, LR2 and LR3 are non-linear but are cranked, and they also border the first-blocks 6 and second-blocks 8 of the design 4.

Figure 8:
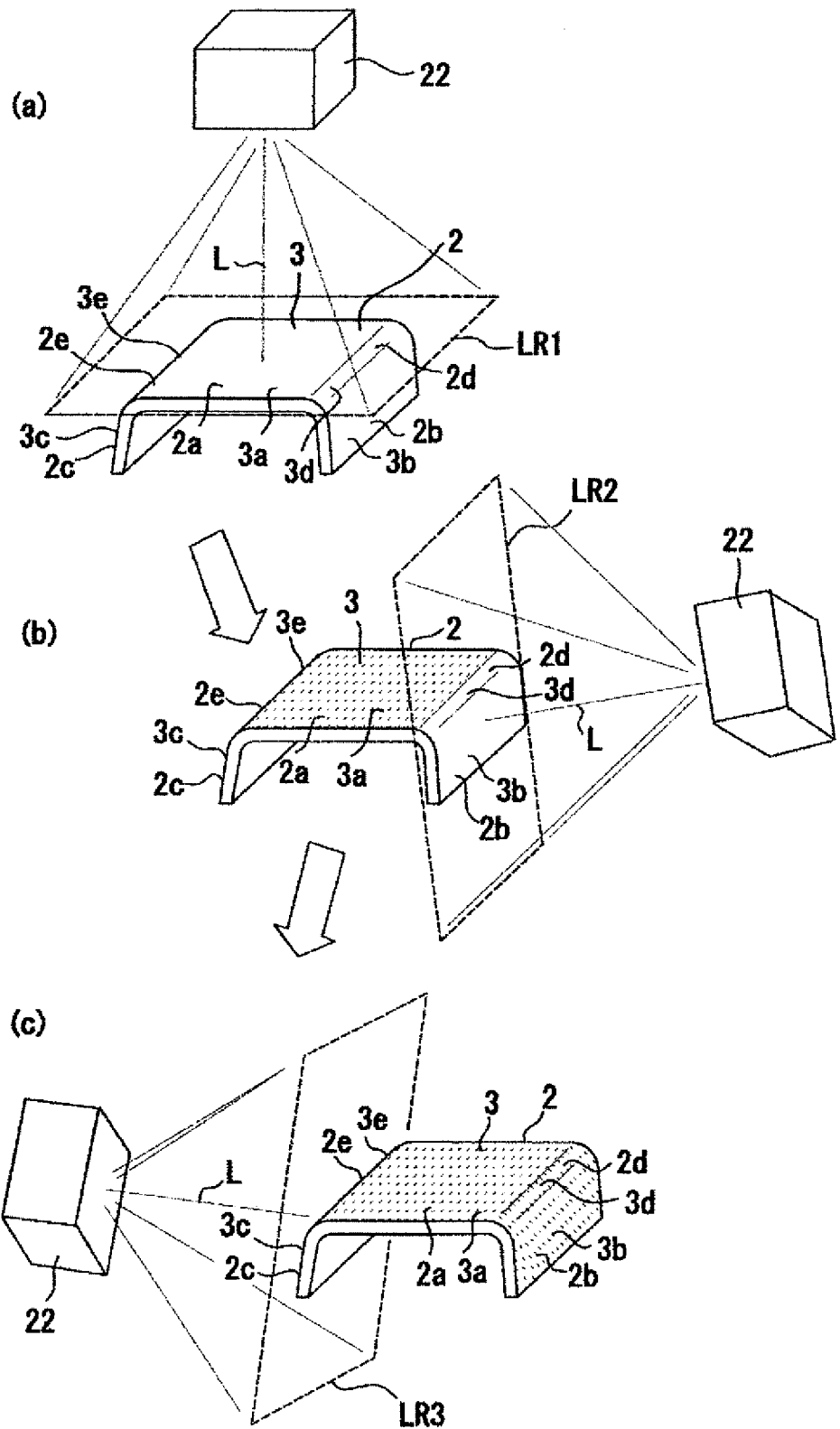
FIG. 8 (a), (b) and (c) are the explanatory-diagrams showing the laser-irradiation process.

The CPU 31, after setting the laser-irradiation regions LR1, LR2 and LR3, determines the sequential order of the laser-irradiation procedure. Accordingly, the laser-irradiation data is prepared, and the CPU 31 then conducts the laser-irradiation procedure according to the laser-irradiation data, thus drawing the predetermined-design 4 on the whole decorative-part. For instance, as shown in FIG. 8 (a) to (c), the laser L is irradiated in the order of irradiation. In other words, as shown in FIG. 8(a), the laser-deflector 22 is displaced above the part-material 2 to face the surface 3a of the main-part 2a, thus being set over the laser-irradiation region LR1. Under this condition, the laser L must be irradiated onto the surface 3a of the main-part 2a and onto part of the curved-surface 3d of the connecting-curved-part 2e (i.e. the left-side of the joint-line J1, as shown in FIG. 7) and onto part of the curved-surface 3e of the connecting-curved-part 2e (i.e. the right-side of the joint-line J2, as shown in FIG. 7).

Next, as shown in FIG. 8(b), the laser-deflector 22 is displaced to the right side of the part-material 2 to face the surface 3b of the side-part 2b, thus being set over the laser-irradiation region LR2. At this time, the laser-deflector 22 is slightly slanted to the connecting-curved-part 2d. Under this condition, the laser L is irradiated onto the surface 3b of the side-part 2b and onto part of the curved-surface 3d of the connecting-curved-part 2d (i.e. the right-side of the joint-line J1, as shown in FIG. 7). Finally, as shown in FIG. 8(c), the laser-deflector 22 is displaced to the left side of the part-material 2 to face the surface 3c of the side-part 2c, thus being set over the laser-irradiation region LR3. At this time, the laser-deflector 22 is slightly slanted to the connecting-curved-part 2e. Under this condition, the laser L is irradiated onto the surface 3c of the side-part 2c and onto part of the curved-surface 3e of the connecting-curved-part 2e (i.e. the left-side of the joint-line J2, as shown in FIG. 7), thus completing the drawing of the design 4. The automobile-interior part 1 is manufactured according to such a series of these procedures. Also, the embodiment of this invention describes its method for the relative displacement of the laser-deflector 22. However, concerning the displacement of the part-material 2, it is possible to use a different method from that of the embodiment of this invention.

Therefore, the embodiments of this invention realize the following effects.

(1) Of the method for manufacturing the automobile-interior part 1 of the embodiment of this invention, prior to the laser-irradiation process a laser-irradiation-region-setting process is done, of which the decorative-area onto which the design 4 is to be drawn is divided into a plurality of laser-irradiation regions LR1, LR2 and LR3. Then, the joint-lines J1, J2, as borderlines of the plurality of the laser-irradiation regions LR1, LR2 and LR3, are set, and they are also the borderlines of the first-blocks 6 and the second-blocks 8 of the design 4. During the laser-irradiation process, the laser-deflector 22 is relatively displaced, and the laser L is then irradiated onto each of the plurality of laser-irradiation regions LR1, LR2 and LR3, thus forming the design 4 across the joint-lines J1, J2 of the adjoining laser-irradiation regions LR1, LR2 and LR3 without overlaying the design-patterns 5, 7 across each laser-irradiation region. As such, the joint-lines J1, J2 in bordering the adjoining laser-irradiation regions LR1, LR2 and LR3 also border the blocks 6 and the blocks 8 without splitting the design-patterns 5, 7. In this case, the joint-lines J1, J2 are not formed in the design-patterns 5, 7, as is shown to happen in the conventional arts. Therefore, the joint-lines J1, J2 are unnoticeable, thus avoiding deterioration in the quality of the design of the automobile-interior part 1.

(2) Of the automobile-interior part 1 of the embodiment of this invention, the design 4 that is to be laser-drawn onto the part-material 2 is one that represents a carbon-fiber-woven fabric and is structured so that the first-blocks 6 of the multiple elongated-design patterns 5 are closely arranged with the second-blocks 8 of the multiple elongated-design patterns 7, with the second-blocks 8 being directed in a different direction from that of the first-blocks 6. Drawing such a design 4 that represents a carbon-fiber-woven fabric makes it possible to provide a high-quality design on the automobile-interior part 1.

(3) Of the automobile-interior part 1 of the embodiment of this invention, the part-material 2 comprises the main-part 2a with the surface 3a of which the surface-area is relatively large; comprises the side-parts 2b, 2c with the surfaces 3b, 3c of which the surface-area is relatively small; and comprises the connecting-curved-parts 2d, 2e that are located between the main-part 2a and the side-parts 2b, 2c, which in turn comprise the curved-parts 3d, 3e that connect the surface 3a of the main-part 2a to the surfaces 3b, 3c of the side-parts 2b, 2c respectively. The joint-lines J1, J2 bordering the laser-irradiation regions LR1, LR2 and LR3 are set near the surface 3a of the main-part 2a on the curved-surface 3d, 3e. Of the embodiment of this invention, the curved-surfaces 3d, 3e of the connecting-curved-parts 2d, 2e is a state of which the partial design-patterns 5, 7 of blocks 6 and blocks 8 come out of the first and second faces. The design-patterns 5, 7 that run out of the surface 3a of the main-part 2a to the curved-surfaces 3d, 3e are of greater difference in height than the design-patterns 5, 7 on the surface 3a of the main-part 2a, thus making it difficult for the laser to be extended to further the process. On the other hand, the design-patterns 5, 7 running out of the surfaces 3b, 3c of the side-parts 2b, 2c and having a smaller surface-area than the curved parts 3d, 3e are of lesser difference in height than the design-patterns 5, 7 on the surface 3b, 3c on the side-parts 2b, 2c, thus making it easier for the laser to be extended to further the process. As such, when setting the joint-lines J1, J2 that border the laser-irradiation regions LR1, LR2 and LR3 at the position near the surface 3a of the main-part 2a on the curved-surfaces 3d, 3e of the connecting curved-parts 2d, 2e, such design-patterns 5, 7 extending to the curved-surfaces 3d, 3e can be surely processed when processing the design-patterns 5, 7 on the surfaces 3b, 3c of the side-parts 2b, 2c (see FIG. 8 (b) and (c). Also, in setting the joint-lines dl, J2 that border the laser-irradiation regions LR1, LR2 and LR3 on the curved-surfaces 3d, 3e of the connecting curved-parts 2d, 2e of the part-material 2 as the embodiment of this invention, it makes it difficult to see the joint-lines J1, J2, thus avoiding deterioration in the quality of the design of the automobile-interior part 1.

(4) The automobile-interior part 1 of the embodiment of this invention forms the design-patterns 5, 7 that are made by the laser-processed groove M1 (concave part) on the laser-irradiation regions LR1, LR2 and LR3. The depth (of the concave-part) is 6 µm through 1 µm, and the width is 30 µm through 110 µm. Forming such a laser-processed groove M1 of depth D1 and width W1 within such favorable ranges makes it possible to draw the design 4 evenly and accurately, even when the plurality of the first-blocks 6 and the second-blocks 8 comprising the plural design-patterns 5, 7 are closely arranged. As such, it is surely possible to provide a high-quality design on the automobile-interior part 1.

The embodiments of this invention can be modified, as described below.

As shown in the automobile-interior part 1 of the above embodiment, the surface 3a of the main-part 2a of the part-material 2 is smaller than that of the irradiation-range 35 of the laser-irradiation device 13. However, it is not limited to this. Specifically, it is possible to apply this invention to a large-sized automobile-interior part of which the surface 3a of the main-part 2a and the surfaces 3b, 3c of the side parts 2b, 2c of the part-material 2 are larger than the irradiation-range 35. In this case, the decorative-regions should be divided on the surface 3a and the surfaces 3b, 3c of the main-part 2a. Also, as the above embodiment, the joint-lines bordering the plurality of the irradiation-regions also border the first-blocks and the second-blocks.

Figure 9:
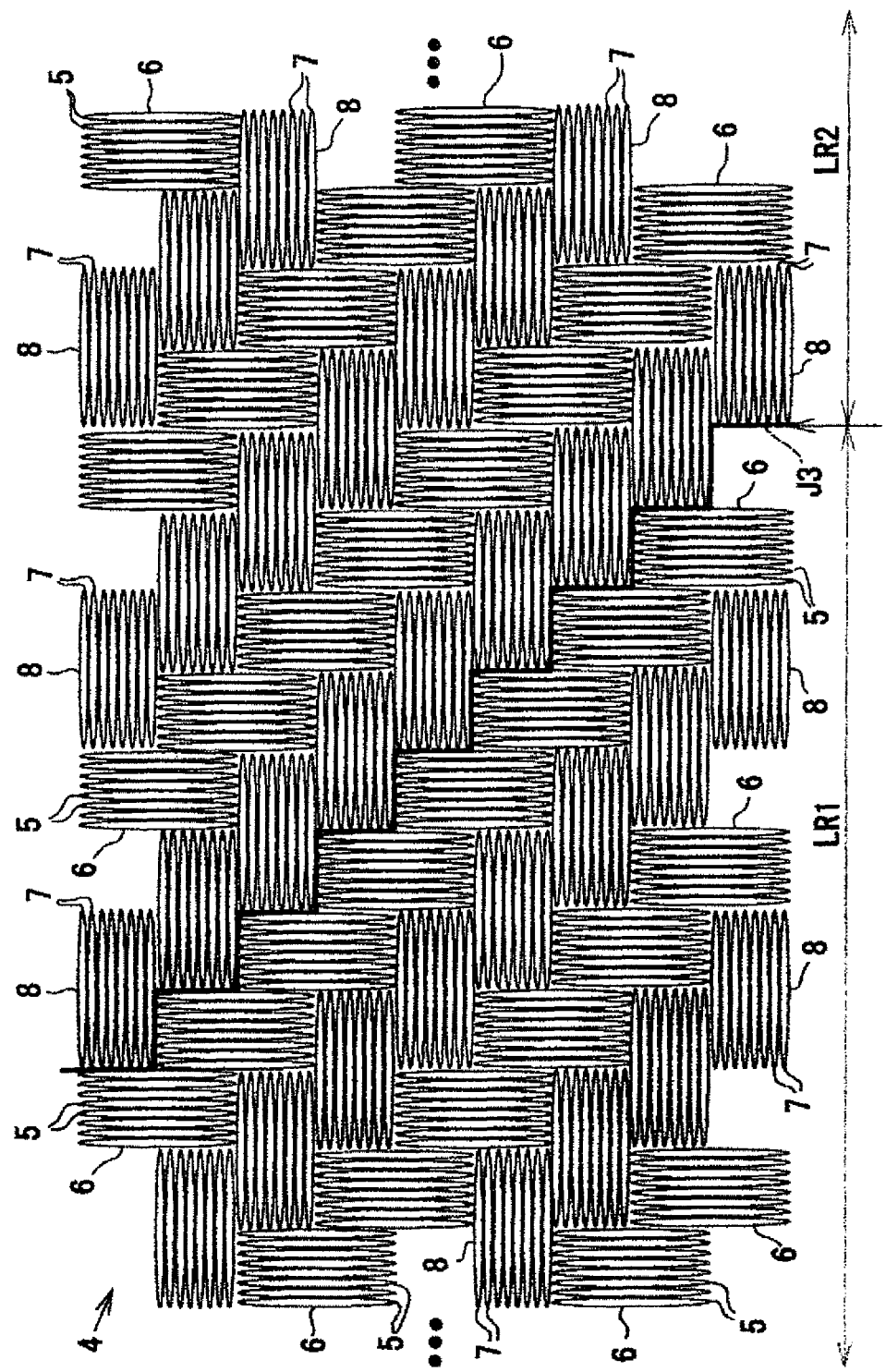
FIG. 9 is the explanatory-diagram showing as another embodiment of this invention the joint-lines bordering the laser-irradiation regions.
Figure 10:
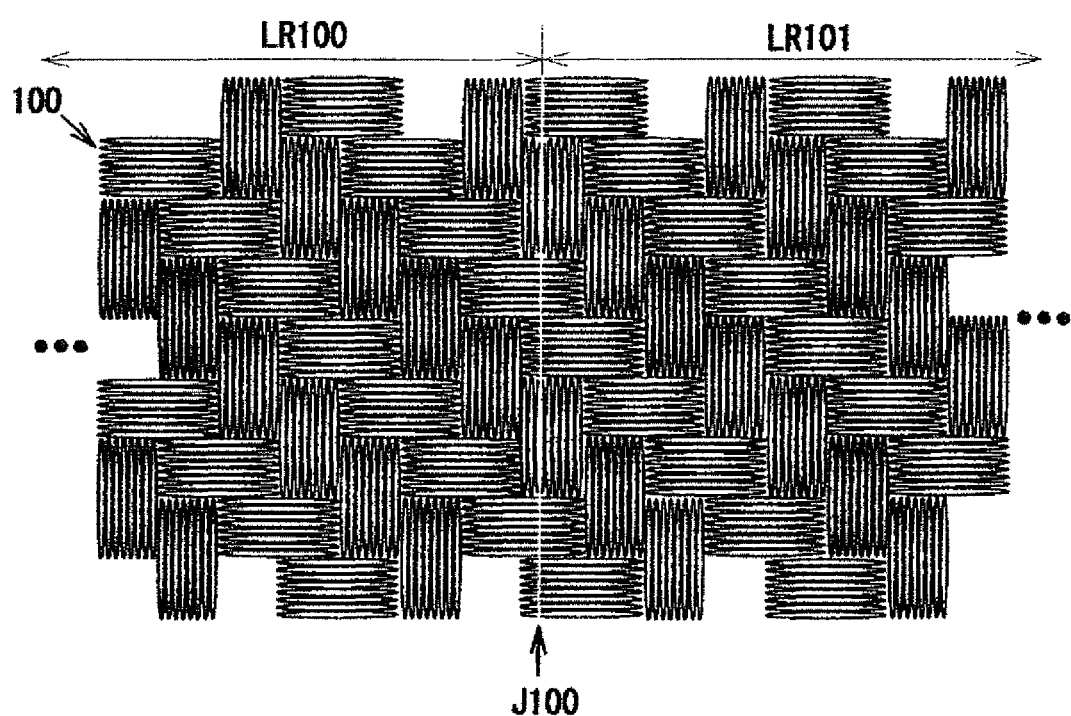
FIG. 10 is the explanatory-diagram showing the joint-line of the conventional design.

As shown in the above embodiment, the joint-lines J1, J2 bordering the plurality of laser-irradiation regions LR1, LR2 and LR3 (see FIG. 7) are cranked. Yet, it is possible to change the figure of the joint-lines J1, J2 according to the figure of the part-material 2 and according to the arrangement of the design 4 or the like. Specifically, as shown in FIG. 9, for example, it is possible to divide the decorative-area into a plurality of laser-irradiation regions LR1, LR2 and LR3 by setting a zigzag joint-line J3 to border the first-blocks and the second-blocks of the design 4.

As shown in the automobile-interior part 1 of the above embodiment, the design 4 is the carbon-like design representing a carbon-fiber-woven fabric. Yet, it is not limited to this. The design to be decorated on the surface of the part-material 2 can be one representing another fiber-woven fabric other than the carbon-like one, or it can be of another design such as a geometric-design pattern.

As shown in the above embodiment, the design 4 is formed on the surfaces 3a to 3e of the black coat-layer 3. However, the design 4 can also be formed on a different colored coat-layer 3, according to the various types of the design 4. Also, it is possible to form the design 4 on a layer formed by plating or by evaporation, other than by coating, as the coat-layer 3, above. Also, it is possible to omit the coat-layer 3 that covers the surface of the part-material 2 and to draw the design 4 directly onto the surface of the part-material 2

As shown in the above embodiment, the design patterns 5, 7 are formed with the laser-processed concave-groove M1. However, it is possible to form the design-pattern with a laser-processed convex part.

As described in the above embodiment, the automobile-interior part 1 is embodied as the armrest of an automobile door. However, it is possible that the automobile-interior part 1 be embodied as a different automobile decorative-part, such as a console-box or an instrument panel or the like. Of course, it is possible to apply this invention to a decorative-part other than that to an automobile-interior part 1, such as to a decorative-panel for furniture or for electrical appliances or the like.

Besides the technical ideas of this invention, as described above, other technical ideas to be understood are described hereinafter.

(1) The first aspect of this invention is a method for manufacturing a decorative-part, characterized in that a design is formed on joint-lines that border adjoining laser-irradiation regions without overlaying the design-patterns across each laser-irradiation region.

(2) The first aspect of this invention is a method for manufacturing a decorative-part, characterized in that a concave-part, of which the depth is from 6 µm through 16 µm and the width is from 30 µm through 110 µm, is formed on a laser-irradiation region.

(3) The first aspect of this invention is a method for manufacturing a decorative-part, characterized in that the joint-lines that border the adjoining laser-irradiation regions do not divide the design-pattern.

(4) The first aspect of this invention is a method for manufacturing a decorative-part, characterized in that the joint-lines that border the adjoining laser-irradiation regions are cranked or bent in a zigzag manner.

(5) The first aspect of this invention is a method for manufacturing a decorative-part, characterized in that the joint-lines that border the adjoining laser-irradiation regions are each multiply bent at right angles.

(6) The first aspect of this invention is a method for manufacturing a decorative-part, characterized in that the decorative-part comprises a resin-compact that is three-dimensionally formed as a part-material; that such a decorative-part comprises a coat-layer that is formed to cover the surface of the resin-compact with a black coating-agent; and that thereon such decorative-part the design is one representing a carbon-fiber-woven fabric that has been drawn on the coat-layer.

(7) The first aspect of this invention is a method for manufacturing a decorative-part, characterized in that the decorative-part is an automobile-interior part.

DESCRIPTION OF THE REFERENCE SIGNS

J1: Automobile-interior part as the decorative-part
2: Part-material
2a: Main-part as the first-part
2b, 2c: Side-part as the second-part
2d, 2e: Connecting curved-part
3a: Surface of the main-part as the first-face
3b, 3e: Surface of the side-part as the second-face
3d, 3e: Curved-surface
4: Design
5: Design-pattern of the first-block
6: First-block
7: Design-pattern of the second-block
8: Second-block
L: Laser
LR1, LR2 and LR3: Laser-irradiation regions
J1 to J3: Joint-line
22: Laser-deflector

The invention claimed is:

1. A method for manufacturing a decorative-part by a laser-irradiation process of which a laser is irradiated by a laser-irradiation device onto a decorative-area set on the surface of a three-dimensional part-material, thereby drawing a design thereon that aligns a plurality of design-patterns on the decorative-area, characterized in that the design comprising a fiber-woven fabric with first-blocks of a plurality of elongated-design patterns being closely arranged with second-blocks of a plurality of elongated-design patterns, the second-blocks being directed in a different direction from those of the first-blocks, and that prior to the laser-irradiation process, a laser-irradiation region-setting process is done to set the joint-lines of the laser-irradiation regions as borders of the first-blocks and the second-blocks and/or of the borders of the same type of first-blocks and second-blocks, wherein the joint-lines are cranked or bent in a zigzag manner, and then irradiating the laser onto each of the laser-irradiation regions by relatively displacing the laser-deflector of the laser-irradiation device or by relatively displacing the three-dimensional part-material, wherein the three-dimensional part-material comprises:

a first-part of a first-face of a relatively large surface-area;

a second-part of a second-face of a relatively small surface-area; and a connecting-curved-part with a bent-section for connecting the first-part to the second-part, the connecting-curved part located between the first-face and the second-face, wherein the decorative-area of the part-material extends over the first-face and the second-face and during the laser-irradiation-region-setting process, the joint-line is set in position near a first-face of the curved-surface of the connecting-curved-part.

2. A method for manufacturing the decorative-part according to claim 1, wherein each design-pattern of the second-block bisects at a right angle with each design-pattern of the first-blocks.

3. A method for manufacturing the decorative-part according to claim 1, characterized in that the decorative-part comprises a resin-compact that is three-dimensionally formed as the three-dimensional part-material and has a coat-layer that is formed to cover a surface of the resin-compact with a black coat-agent, and that the design is one representing a carbon-fiber-woven fabric and is drawn on the coat-layer.

* * * * *